United States Patent
Dambacher

(10) Patent No.: US 11,578,180 B2
(45) Date of Patent: Feb. 14, 2023

(54) METHOD OF CHEMICALLY MODIFYING PLASTIC SURFACES

(71) Applicant: Omniome, Inc., San Diego, CA (US)

(72) Inventor: Corey M. Dambacher, San Diego, CA (US)

(73) Assignee: PACIFIC BIOSCIENCES OF CALIFORNIA, INC., Menlo Park, CA (US)

( * ) Notice: Subject to any disclaimer, the term of this patent is extended or adjusted under 35 U.S.C. 154(b) by 108 days.

(21) Appl. No.: 16/631,656

(22) PCT Filed: Jul. 17, 2018

(86) PCT No.: PCT/US2018/042444
§ 371 (c)(1),
(2) Date: Jan. 16, 2020

(87) PCT Pub. No.: WO2019/018366
PCT Pub. Date: Jan. 24, 2019

(65) Prior Publication Data
US 2020/0199318 A1    Jun. 25, 2020

Related U.S. Application Data

(60) Provisional application No. 62/533,830, filed on Jul. 18, 2017.

(51) Int. Cl.
| | | |
|---|---|---|
| *C08J 7/12* | (2006.01) | |
| *B01D 15/38* | (2006.01) | |
| *B01J 20/24* | (2006.01) | |
| *B01J 20/32* | (2006.01) | |
| *B01L 3/00* | (2006.01) | |

(52) U.S. Cl.
CPC .......... *C08J 7/123* (2013.01); *B01D 15/3823* (2013.01); *B01J 20/24* (2013.01); *B01J 20/3282* (2013.01); *B01L 3/502707* (2013.01); *B01L 2200/12* (2013.01); *B01L 2300/0877* (2013.01); *C08J 2325/06* (2013.01); *C08J 2489/00* (2013.01)

(58) Field of Classification Search
CPC . G01N 21/00; C12M 1/34; C12M 3/00; C08J 7/123; B01D 15/3823; B01J 20/24; B01L 3/502707; B01L 3/00; B01L 3/5027; B01L 3/5023; B01L 2300/0877; A61J 1/06
See application file for complete search history.

(56) References Cited

U.S. PATENT DOCUMENTS

| | | | |
|---|---|---|---|
| 6,696,304 B1* | 2/2004 | Davies | G01N 33/54346 436/15 |
| 2010/0111768 A1* | 5/2010 | Banerjee | G01N 21/6456 422/82.08 |
| 2016/0331852 A1* | 11/2016 | Zeglis | A61K 51/0482 |
| 2018/0208922 A1* | 7/2018 | Dambacher | C12N 15/1024 |

FOREIGN PATENT DOCUMENTS

| | | |
|---|---|---|
| JP | 2009-186361 A | 8/2009 |
| WO | 98/22542 A2 | 5/1998 |

OTHER PUBLICATIONS

AU2018302034, "First Examination Report", dated Jul. 2, 2020, 5 pages.
PCT/US2018/042444, "International Search Report and Written Opinion", dated Dec. 17, 2018, 16 pages.
PCT/US2018/042444, "Invitation to Pay Additional Fees and, Where Applicable, Protest Fee", dated Oct. 23, 2018, 11 pages.
AU2018302034, "Second Examination Report", dated Nov. 9, 2020, 4 pages.
CA3,070,407, "Office Action", dated Apr. 7, 2021, 4 pages.

* cited by examiner

*Primary Examiner* — Brian J. Sines
(74) *Attorney, Agent, or Firm* — Kilpatrick Townsend & Stockton LLP

(57) ABSTRACT

Disclosed herein are finished products, methods, compositions and kits for derivatizing plastic (e.g., "polymer") surfaces in a manner that renders the surfaces appropriate for various downstream applications. For example, flow cells incorporating modified plastic surfaces provide greatly enhanced stability for retention of attached chemical species such as polypeptides and nucleic acids.

20 Claims, No Drawings

US 11,578,180 B2

METHOD OF CHEMICALLY MODIFYING PLASTIC SURFACES

CROSS REFERENCE TO RELATED APPLICATIONS

This application is the U.S. National Phase Application of International Application No. PCT/US2018/042444, filed on Jul. 17, 2018, which claims priority to U.S. Provisional Application No. 62/533,830, filed Jul. 18, 2017, and the contents of which are hereby incorporated by reference herein in their entirety.

TECHNICAL FIELD

The present disclosure generally relates to the field of biotechnology. More specifically, the disclosure relates to manufactured articles, kits, and methods of modifying plastic surfaces. Still more specifically, the disclosure relates to the preparation of microfluidic flow cells for biochemical analyses, including nucleic acid sequence analyses.

BACKGROUND

Microfluidic flow cells and robotic liquid-handling instruments represent alternative platforms for automating multi-step reactions in the modern bioanalytical chemistry laboratory. Flow cells generally contain targets of some sort (e.g., cells, proteins, or nucleic acids) fixed within a chamber, wherein different liquid reagents can be flowed through the chamber and wherein the chamber is configured to facilitate detection of the targets therein. For example, a reagent can flow into the chamber through an inlet port, and exit the chamber through an outlet port. Flowing different reagents in ordered sequence through the flow cell to contact the fixed targets controls the nature of the biochemical reactions that may take place. Likewise, liquid-handling instruments, which are available in many formats, generally transfer liquid reagents under automated control from one vessel to another, where the vessel (e.g., a multiwell plate) holds or contains immobilized targets. Targets commonly are immobilized to beads (e.g., magnetic beads). In some formats, magnetic beads are moved from one vessel to another.

Microfluidic flow cells can be created from one or more sealing layers sandwiched between two substantially flat substrate layers, often made of glass. The sealing layer creates a fluidic channel shape, forms one portion of the channel wall, and typically defines the channel thickness. The two substrates enclose the channel and serve as the top and bottom channel walls. A leak-proof seal is made by clamping the sealing layer in between the substrates and/or adhering the layer to one or both substrates. (see e.g., U.S. Pat. No. 9,150,907)

Certain next-generation nucleic acid sequencing technologies have been automated to employ flow cells, wherein reagent flow across a surface harboring immobilized nucleic acid features conveniently allows for reagent exchange in a cyclic fashion. The flow cell is observed, for example, via fluorescence microscopy techniques to detect changes in the immobilized nucleic acid features that are indicative of their sequences. Example sequencing chemistries that can be carried out in the flow cell format include sequencing-by-binding and sequencing-by-synthesis. Here the flow cells can include planar surfaces decorated with nucleic acid features synthesized in situ, or with microbeads displaying nucleic acids. Considerations important for success when using flow cells for nucleic acid sequencing applications include the quality of the surface with respect to capture and/or retention of the nucleic acid feature to be sequenced.

SUMMARY OF THE INVENTION

Disclosed herein are finished products, methods, compositions and kits for derivatizing plastic (e.g., "polymer") surfaces in a manner that renders the surfaces appropriate for various downstream applications. For example, provided are methods of preparing a modified plastic surface and products comprising modified plastic surfaces.

DETAILED DESCRIPTION

The present disclosure provides reagents and methods by which rapid and efficient chemical modification of plastic surfaces can take place. Modified plastics in accordance with the disclosure provide certain advantages when used in the preparation of flow cells for nucleic acid sequencing or other applications.

Definitions

Unless defined otherwise, all technical and scientific terms used herein have the same meaning as is commonly understood by one of ordinary skill in the art. For clarity, the following specific terms have the specified meanings. Other terms are defined in other sections herein.

The singular forms "a" "an" and "the" include plural referents unless the context clearly dictates otherwise. Approximating language, as used in the description and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the compositions, apparatus, or methods of the present disclosure. At the very least, each numerical parameter should at least be construed in light of the number of reported significant digits and by applying ordinary rounding techniques.

As used herein, "plastic" refers to a synthetic or natural organic polymer that can be shaped into a solid object. Typically, plastic materials are based on hydrocarbon chains and/or ring structures, alone or with any of oxygen, sulfur and nitrogen. Plastic materials will include carbon-hydrogen (i.e., C—H) bonds, and carbon-carbon (e.g., C—C and/or C=C) bonds.

As used herein, "photoactivation" and "photoactivated" and "photoactivatable," and grammatical variants, refer to the activation or control of a chemical reaction by light (e.g., UV light).

As used herein, a "photochemical crosslinker moiety" is any chemical moiety or functional group that can be photoactivated to promote chemical crosslinking between two entities. For example, the chemical moiety can be covalently attached to a plastic-adsorbent polymeric carrier (e.g., without photochemical activation), and subsequently photoactivated to promote covalent crosslinking of the polymeric carrier to the plastic. Crosslinking can occur, for example by insertion of the crosslinker into carbon-hydrogen (i.e., C—H) bonds or carbon-carbon (e.g., C—C and/or C═C) bonds of the plastic material. An aryl azide is one example of a photochemical crosslinker moiety.

As used herein, "photo-crosslinking" and "photochemical crosslinking" refer to the light-induced formation of a covalent bond between two moieties, molecules or other physical entities. Two physical entities that are "photo-crosslinked" to each other represent the product of a photo-crosslinking reaction.

As used herein, an "aryl azide" is a chemical agent having an R—$N_3$ structure, where R is an aromatic ring (e.g., an aromatic hydrocarbon, such as phenyl, naphthyl, thienyl, etc.). Upon photoactivation with ultraviolet light (e.g., 250 nm-350 nm wavelength), the azide functional group forms a reactive intermediate that can form covalent bonds, for example by insertion into carbon-hydrogen (i.e., C—H) bonds or carbon-carbon (e.g., C—C and/or C═C) bonds.

As used herein, "linker" and "chemical linker" and "crosslinker" all refer to a molecular construct that covalently joins two different moieties or molecules (e.g., a plastic polymer and a plastic-adsorbent polymeric carrier protein) to each other. In a particular example, the carbon backbone of a plastic polymer can be crosslinked to a plastic adsorbent carrier protein by a linker that includes a secondary amine, a tetrafluoroaryl functional group (e.g., a benzene ring with fluorine substituents at each of the ortho and meta positions), and optionally an amide functional group. Here the linkage between the plastic and the plastic-adsorbent polymeric carrier can be structured so that: (a) the plastic-adsorbent polymeric carrier is covalently joined without intervening functional groups to a carbon atom of the plastic surface by a secondary amine; (b) the secondary amine can be further covalently joined without intervening functional groups to a tetrafluoroaryl functional group; and (c) the tetrafluoroaryl functional group can be further covalently joined to the plastic-adsorbent polymeric carrier.

As used herein, a "polymeric carrier" refers to a molecule having a structure consisting chiefly or entirely of several similar units bonded together. In particular embodiments, the polymeric carrier can react with a photoactivated aryl azide to form a covalent linkage, and optionally further linked to a second type of chemical agent (the "secondary chemical moiety"). A polymeric carrier is "plastic-adsorbent" when the polymeric carrier attaches to the plastic material via non-covalent bonding, and substantially remains bound to the plastic after one or more cycles of washing with a solution that is free of the polymeric carrier.

As used herein, a "secondary chemical moiety" or "secondary chemical functional group" is a chemical functional group (i.e., a specific group of atoms or bonds within a molecule that is responsible for a characteristic chemical reaction) that, in addition to a photochemical crosslinker moiety (e.g., an aryl azide), can be covalently bonded to a polymeric carrier.

As used herein, a "flow cell" is a reaction chamber that includes one or more channels that direct fluid in a predetermined manner to conduct a desired reaction. The flow cell can be coupled to a detector such that a reaction occurring in the reaction chamber can be observed. For example, a flow cell can contain primed template nucleic acid molecules (e.g., blocked primed template nucleic acid molecules), tethered to a solid support, to which nucleotides and ancillary reagents are iteratively applied and washed away. The flow cell can include a transparent material that permits the sample to be imaged after a desired reaction occurs. For example, a flow cell can include a plastic and/or glass slide containing fluidic channels, through which polymerases, dNTPs and buffers can be pumped. The surface inside the channels can be decorated with one or more primed template nucleic acid molecules to be sequenced. An external imaging system can be positioned to detect the molecules on the inner surface(s) of the flow cell. Reagent exchange can be accomplished by pumping, drawing, or otherwise "flowing" different liquid reagents through the flow cell. Exemplary flow cells, methods for their manufacture and methods for their use are described in U.S. Pat. App. Publ. Nos. 2010/0111768 A1 or 2012/0270305 A1; or International Publ. No. WO 05/065814, each of which is incorporated by reference herein. Certain preferred flow cells include an inner surface made of plastic modified in accordance with the present disclosure.

As used herein, a "vessel" is a container that isolates one reagent or reaction (e.g., a binding reaction; an incorporation reaction; etc.) from another, or that provides a space in which a reaction can take place. Non-limiting examples of reaction vessels useful in connection with the disclosed technique include: flow cells, wells of a multiwell plate; microscope slides; tubes (e.g., capillary tubes); etc. In some instances, a spacer, such as a gasketed frame with a plurality of divisions, can be attached to a planar plastic slide to create temporary reaction vessels that are isolated from each other. Features to be monitored during biochemical reactions can be contained within the reaction vessel.

As used herein, a "feature" is a point, area or volume of a material (e.g., a patterned or random array) that can be distinguished from other points or areas according to relative location. An individual feature can include one or more molecules of a particular type. For example, a feature can include a single target nucleic acid molecule having a particular sequence, or a feature can include an ensemble of several nucleic acid molecules having the same sequence and/or complementary sequence thereof. Different molecules that are at different features of a pattern can be distinguished from each other according to the locations of the features in the pattern. Exemplary features include without limitation, wells in a substrate, beads (or other particles) in or on a substrate, projections (e.g., in situ generated nucleic acid amplification products) from a substrate, pads of gel material on a substrate, pads of polymeric carrier material, or channels in a substrate.

As used herein, "population" refers to a collection of things that are processed or evaluated together. The collection of things can be in some way related to each other (e.g., nucleic acids of the same or different sequences). A "population of nucleic acid features" refers to a collection of nucleic acid features that are processed together (e.g., in a flow cell or in a well of a multiwell plate) or evaluated together. Individuals among the collection may be single nucleic acid molecules (e.g., RCA amplification products), or a collection of homogenous nucleic acid molecules. Individual features can be distinguished from each other within or among the population. To determine the identity of a next correct nucleotide for "a population of nucleic acid features" comprising primed template nucleic acid molecules (e.g., blocked primed template nucleic acid molecules) means to establish identity of the next correct nucleotide for the features that make up the population. As examples, populations of target nucleic acids may be represented by a collection of beads or in situ generated nucleic acid amplification products.

As used herein, a "kit" is a packaged unit containing one or more components, such as reagents for modifying a plastic surface in accordance with the disclosure, a modified plastic material in accordance with the disclosure, or a finished article (e.g., a flow cell) incorporating a modified plastic material in accordance with the disclosure. Reagents of the kit may be distributed among one or more vessels or containers in a packaged arrangement. Optionally, a kit contains as few as a single packaged component.

INTRODUCTION AND OVERVIEW

Biocompatibility of plastics has been widely studied in connection with materials that are implantable within a human body without substantial adverse biological reaction. Another area of industrial importance concerns plastic materials that have been treated to facilitate biological or biochemical processes in vitro. Examples here would include plastic materials that support growth of cells or tissues in culture, as well as plastic substrates that permit biochemical reactions to occur without inhibition of reactivity or substantial loss of reagents (e.g., by adsorption or other loss mechanism).

Significant manufacturing and cost advantages would be realized if flow cells used for sequencing nucleic acids were made from one or more plastic materials (e.g., plastic films or injection molded plastics). Moreover, manufacturing costs would be further reduced and the range of custom sequencing applications would be increased if procedures for generating flow cells could be conveniently performed by an end-user. In this way, enzymatic synthesis of nucleic acid features in a flow cell could be accomplished quickly and economically, thereby facilitating more rapid uptake of next generation sequencing technologies.

Preliminary testing conducted during development of the techniques described herein confirmed that a wide variety of plastic materials could be used to prepare flow cells that would be compatible with the production and sequencing of nucleic acid amplification products generated in situ. Unfortunately, nucleic acid amplification products were found to be unstable on the plastic surfaces under conditions that were tested. More specifically, results indicated that nucleic acid features being sequenced were lost from (e.g., washed off) the plastic surface during the fluid flow cycles used for determining cognate nucleotide identity, incorporating nucleotides (e.g., reversible terminator nucleotides), and processing the flow cell to repeat the needed cycles. Indeed, less than 80% of in situ synthesized nucleic acid features were retained after 14 cycles of sequencing on a plastic surface, where each of four candidate nucleotides was tested as the next correct nucleotide before incorporating an unlabeled reversible terminator nucleotide. This loss rate would not support the repetition of cycles needed for sequencing of greater than a few dozen nucleotides, and so motivated efforts to improve retention of nucleic acid features among a population of nucleic acid features.

DESCRIPTION OF THE TECHNIQUE

Disclosed herein are finished products, methods, and kits for derivatizing plastic (e.g., "polymer") surfaces in a manner that renders the surfaces appropriate for various downstream applications. Optionally, plastic articles modified by the disclosed technique can be used for processing biological materials. Examples of this processing include the capture and analysis of biological analytes (e.g., cells, proteins, nucleic acids, carbohydrates, lipids, etc.); growth of cells in liquid culture on a surface; lateral flow assay substrates; flow cells and other substrates for immobilization of microbeads. Particular examples involve derivatized plastics that may be used for capturing proteins (e.g., streptavidin) and/or nucleic acids to be analyzed in conjunction with nucleic acid sequencing procedures.

The present techniques advantageously lend themselves to chemical modification of many different types of plastic materials. In some instances, plastic sheets or films can be modified by the disclosed process. Here the plastic may have been shaped into a thin planar configuration before the chemical modification that imparts the improved chemical properties. Generally speaking, the technique is applied to plastic or polymeric articles manufactured from polymeric materials. Injection moldable plastics also can be used following an injection molding process that results in a shaped plastic product. Stated differently, the disclosed technique preferably is applied to a plastic article that results from shaping or injection molding, as opposed to chemical modification of the plastic material that is to be melted and shaped or used to create an injection molded object. Examples of plastics that can be used include polystyrene, cyclic-olefin polymers ("COP"), cyclic-olefin copolymers ("COC"), etc. Other examples of useful plastics are presented below. In fact, good results have been achieved across the range of plastics tested with the technique.

Particular embodiments of the techniques are demonstrated herein by a highly stringent test involving manufacture of a plastic substrate used for enzymatically synthesizing and sequencing a nucleic acid template in situ. Immobilized nucleic acid features generated on the modified substrate were subjected to a cyclical process of nucleic acid sequencing with improved results. Success of the sequencing procedure proved that the modified plastic substrate was compatible with biochemical processes that are sensitive to efficient completion of enzymatic reactions, processing of nucleotides, processing of fluorescently labeled biological molecules, etc.

In some embodiments, a plastic-adsorbent polymeric carrier (e.g., a biological macromolecule) modified to include an aryl azide is covalently linked to the plastic surface as part of the chemical processing procedure. The macromolecule can be a naturally occurring or synthetic polypeptide or protein having a range of different chemical functional groups. Optionally, the macromolecule is a naturally occurring protein, such as albumin (e.g., bovine serum albumin, or "BSA"), casein, avidin or streptavidin, that may have undergone at least partial purification. Alternatively, the macromolecule can be a saccharide (i.e., a sugar) or polysaccharide (i.e., a carbohydrate, such as dextran). The biological macromolecule can include, but need not possess any functional biological activity. Generally speaking, the biological macromolecule adsorbs to the type of plastic material being modified, and so can be referred to as a "plastic-adsorbent polymeric carrier." The macromolecule is sometimes referred to herein simply as a "carrier" molecule.

The plastic-adsorbent polymeric carrier can first be derivatized with at least one chemical agent, such as a chemical agent having an aryl azide functional group. Optionally, the polymeric carrier is derivatized with two chemical agents, where one chemical agent includes an aryl azide functional group, and where another chemical agent provides a different chemical functionality. Exemplary different chemical groups include, without limitation: a biotin moiety, a chemically reactive moiety (e.g., an N-hydroxysuccinimide ester), an oligonucleotide, an antigen, a ligand, a receptor, or other molecule having desired properties.

The derivatized polymeric carrier can next be delivered via liquid phase to contact the plastic surface that is to be modified, excess carrier can be removed by washing to leave a monolayer, and then the carrier in the monolayer can be linked to the plastic surface by photo-crosslinking. The photo-crosslinking can involve use of ultraviolet ("UV") irradiation or other wavelength of light appropriate for the photo-reactive reagents in use. Following the photo-crosslinking step, the derivatized plastic surface optionally can be further treated or modified to render it appropriate for specific applications. For example, if the plastic-adsorbent polymeric carrier linked to the surface includes biotin moieties, then the modified surface can be contacted with a solution that includes streptavidin. Likewise, non-derivatized streptavidin can be added before photo-crosslinking, so that streptavidin attaches to the plastic through the covalently attached polymeric carrier, thereby providing enhanced stability. The streptavidin will in turn become immobilized to the surface, thereby presenting a field available for capture of biotinylated molecules or other entities or complexes, including biotinylated nucleic acid strands, biotinylated antibodies, biotinylated antigens, biotinylated enzymes such as polymerases or transposases, biotinylated cells, biotinylated complexes, and the like.

Useful Plastics

The disclosed technique advantageously can be used for modifying a wide variety of plastic or polymeric materials that include carbon-hydrogen (i.e., C—H) bonds and carbon-carbon (e.g., C—C and/or C=C) bonds. Preferred plastics or polymers include: cyclic olefin copolymer (COC); cyclo-olefin polymer (COP); polystyrene (PS); polycarbonate (PC); and poly(methyl methacrylate) (PPMA). Optionally, the polymeric material is shaped into a substantially rigid configuration. For example, the material can be shaped to have a thickness that resists flexing when used as a planar surface for a flow cell. In an alternative option, the polymeric material is an elastic polymer that is flexible and can be bent or rolled.

Plastic articles to be modified by the disclosed technique can be manufactured from non-modified base plastic materials, such as those described immediately above. The manufactured article can then be modified by photo-crosslinking to a polymeric carrier molecule (e.g., a protein, peptide, polyamine, or other agent) that is chemically joined to an aryl azide, and preferably further chemically joined to a second type of functional group. For clarity, the aryl azide can be joined to the polymeric carrier before, after, or at the same time as joining of the secondary chemical functional group or moiety. In an illustration presented below, the polymeric carrier molecule was a protein, the protein was modified to display one or more aryl azide functional groups, and the protein further was modified to display one or more biotin moieties. In this way, a second type of functional group (e.g., biotin) was immobilized to the plastic surface upon photo-crosslinking of the polymeric carrier-aryl azide to the plastic surface. This approach enhances the range of articles that may be modified, since the initial manufacture is carried out using a plastic material that need not be modified with either the aryl azide or with the second type of functional group. Of course, downstream processing (e.g., cutting, shaping, laminating, laser welding, etc.) of the chemically modified plastic article to construct a finished product can be carried out after the photo-crosslinking procedure is completed. For example, the plastic article may be a plastic film that is photo-crosslinked to a protein displaying both aryl azide and biotin functional groups, and all or part of the modified plastic film integrated into another structure, such as a flow cell.

In some embodiments, the plastic surface modified by the described technique can be a plastic layer or coating attached to a rigid support material made of some other material. Exemplary support materials for the plastic surface being modified include, but are not limited to, metal, glass, and plastic.

Useful Polymeric Carrier Molecules

Exemplary polymeric carrier molecules that may be used to perform the disclosed procedure are characterized by the ability to adsorb to the plastic surface that is to be modified. Optionally, the polymeric carrier that adsorbs to the plastic further includes other chemical functional groups, such as primary amine functional groups, or carboxylate functional groups. Thus, any peptide or polypeptide displaying primary amine functional groups (e.g., containing lysine residues) optionally can be used with good results. The same is true for peptides or polypeptides displaying carboxylate groups (e.g., side chains of aspartate or glutamate) also can be used. Bovine serum albumin was used as the example protein in the procedures described herein, below. Of course, this was merely an illustrative example, and synthetic or naturally derived proteins containing lysine, aspartate, or glutamate residues also may be used with good results. Other proteins can be useful such as albumin, casein, histone, avidin, streptavidin, antibody or protein A. Mixtures of proteins can be useful such as those derived from Milk or cellular lysates.

A wide range of polymeric carrier molecules can be used to perform the chemical modification procedure. Optionally, the plastic-adsorbent polymeric carrier molecules are polypeptides or proteins. Non-limiting examples of proteins that may be used in the procedure include: plasma proteins, serum proteins, albumins (e.g., bovine serum albumin), collagen, gelatin, casein, etc. Non-limiting examples of polyamines include: spermidine, spermine, and putrescine, or chemical derivatives thereof. Peptides that may be used include those containing lysine, polylysine, aspartate, glutamate, and chemical derivatives thereof. Of course, synthetic peptides that adsorb to the plastic surface, and that contain one or more lysine, cysteine, or tyrosine residues optionally may be covalently coupled to the aryl azide, which subsequently can be photo-crosslinked to a plastic material.

Useful Attachment Chemistries

As described herein, plastic surfaces can be chemically modified by photochemical crosslinking of chemically modified polymeric carrier molecules, such as polymeric carrier protein molecules modified to harbor one or more photochemical crosslinker moieties. Optionally, a polymeric carrier protein modified to harbor a photochemical crosslinker (e.g., an aryl azide functional group) further is modified to harbor a second type of functional group (i.e., a "secondary chemical moiety"). The second type of functional group may confer an ability to interact with a second type of macromolecule (e.g., a second protein, or a nucleic acid) or to interact with some other molecule or material. Optionally, the second type of functional group is, or includes a biotin moiety.

Covalent attachment between the polymer surface and the polymeric carrier molecule optionally is mediated by photo-crosslinking of the polymer surface and polymeric carrier molecule modified to include a photochemical crosslinker moiety. Exemplary aryl azide functional groups that may be used as the photochemical crosslinker moiety include, but are not limited to: tetrafluorophenyl azide; phenyl azide; ortho-hydroxyphenyl azide; meta-hydroxyphenyl azide; ortho-nitrophenyl azide; and meta-nitrophenyl azide. Tetrafluorophenyl azide is an example of a preferred functional group, with 4-azido-2,3,5,6-tetrafluorobenzoate being highly preferred.

Optionally, the aryl azide that is to be covalently joined to the polymeric carrier molecule prior to photo-crosslinking is linked through a chemical linker (e.g., a linker including an ester linkage, a glycol linkage, or an ether linkage) to a chemical activating group, such as a succinimide group, or a maleimide group. One example would be a succinimide ester of tetrafluorophenyl azide. Indeed, N-succinimidyl 4-azido-2,3,5,6-tetrafluorobenzoate, commercially available from Santa Cruz Biotechnology, Inc. (Dallas, Tex.) is a tetrafluorinated, aryl azide-based, amine- and photoreactive crosslinker. Notably, NHS esters also react with amino groups of proteins under aqueous conditions (see Keana et al., *J. Org. Chem.*, 55:3640-3647 (1990)), and this is one mechanism by which polymeric carrier molecules can be modified by the disclosed technique.

Photoactivation of azido functional groups in accordance with the disclosure can result in expulsion of nitrogen gas ($N_2$) and production of a highly reactive nitrene intermediate that covalently inserts into carbon-hydrogen (i.e., C—H) bonds, or alternatively into carbon-carbon (e.g., C—C and/or C=C) bonds of the plastic surface being modified. Optionally, an azido functional group is joined at the ipso position of an aryl (e.g., phenyl-) functional group in an aryl azide moiety, that in turn is joined at the para position of the ring structure to a plastic-adsorbent carrier molecule prior to any photolytic exposure. Joining to the plastic-adsorbent carrier can be through a linker that includes a secondary amine. Optionally, the aryl azide attached to the plastic-adsorbent carrier further includes fluorine substituents at both ortho positions of the ring structure, with attachment to the plastic-adsorbent carrier being mediated through the para position of the ring. In a highly preferred embodiment, the aryl azide attached to the plastic adsorbent carrier molecule includes fluorine substituents at both ortho positions, and at both meta positions of the ring structure (i.e., a tetrafluorophenyl azide). Following photolysis, the single remaining nitrogen atom attached at the ipso position of the ring structure covalently joins to the plastic surface to form a secondary amine.

According to the present technique, a plastic-adsorbent polymeric carrier molecule (e.g., a protein) covalently modified to harbor an aryl azide functional moiety is contacted to a polymer surface and permitted to adsorb thereto. Optionally, this is accomplished by contacting the polymer surface with a composition including the chemically modified polymeric carrier molecule. The composition used in this step need not be highly purified, and may even be a reaction mixture used for attaching the aryl azide to the polymeric carrier molecule (e.g., protein). For example, if an NHS ester of the aryl azide is used for attaching the aryl azide functional group to a polymeric carrier protein, that reaction mixture, which may include unreacted NHS ester, can be contacted to the polymer surface that is to be modified. Preferably, the unreacted NHS ester of the aryl azide, together with the non-adsorbed modified polymeric carrier protein remaining free in solution is removed from contact with the polymer surface before photo-crosslinking with UV light takes place. This may be effected by washing of the polymer surface following the contacting step. A final wash can be effected using water. The water can be essentially pure water that is substantially free of buffers or other chemical agents having carbon atoms, or containing reducing agents (e.g., DTT or β-mercaptoethanol), since these groups may reduce the azide functional group to an amine and thereby prevent photoactivation, and may be reactive with nitrenes produced during the photolysis step.

While not wishing to be bound by any particular theory of operation, washing of the contacted polymer surface to remove unreacted aryl azide (i.e., aryl azide not covalently bound to the polymeric carrier molecule) and non-adsorbed modified polymeric carrier may result in a monolayer adsorbed to the polymer surface. This desirably localizes aryl azide moieties to the plastic surface that is to be modified, while maintaining reagents in the liquid phase (i.e., it is unnecessary to dry the aryl azide-modified protein onto the plastic surface before crosslinking). Optionally, the plastic surface being modified by the present technique is washed free of unbound aryl azide-modified protein before initiating photo-crosslinking, and further optionally, the washed surface need not be dried before initiating photo-crosslinking. Optionally, liquid from the washed monolayer is removed or decanted before initiating photo-crosslinking.

Preferably, portions of the polymer surfaces to be modified to support synthesis of nucleic acid features in situ do not contact an aryl azide compound without also contacting a protein or other polymeric carrier covalently modified to display the aryl azide functional group of that aryl azide compound. By this approach, the portion of the polymer surface that is modified may contact the functionalized protein in the absence of free aryl azide (e.g., as may result from incomplete reaction between the protein and the aryl azide, without purification of the modified protein or polymeric carrier before contacting the polymer surface). Of course, portions of the polymer surface other than those modified to support synthesis of nucleic acid features in situ can contact the aryl azide without also contacting an aryl azide-modified polymeric carrier.

Optionally, the polymeric carrier or protein modified to harbor one or more covalently attached aryl azide functional groups also is chemically modified to include at least one other type of secondary chemical functional group or moiety. Examples here include biotin moieties, tetrazine moieties, trans-cyclooctene-containing bifunctional groups (e.g., reagents for "click" chemistry), etc. Exemplary reagents and conditions for click chemistry are set forth in U.S. Pat. No. 6,737,236 or 7,427,678, each incorporated herein by reference. A useful family of reactions is the azide alkyne Huisgen cycloaddition, which uses a copper catalyst (e.g., U.S. Pat. Nos. 7,375,234 and 7,763,736, each incorporated herein by reference). Other reactions include copper-free Huisgen reactions ("metal-free click") using strained alkynes. In such embodiments, covalent attachment of the polymeric carrier to the plastic surface also will immobilize the secondary chemical agent by virtue of its linkage to the polymeric carrier.

Methods set forth in Mecomber et al., in *Langmuir* 24: 3645-3653 (2008) can achieve chemical modification of polymer surfaces using perfluorinated aromatic azides having quaternary amine or aldehyde functional groups. More specifically, a functionalized aryl azide can be dried onto the polymer surface, and then crosslinked to the polymer surface. The described methods can provide a route for covalently modifying the surface to display amines or aldehydes. Functional groups of the modified surface subsequently can be reacted with secondary molecules, such as enzymes, to immobilize those secondary molecules.

The present technique for creating chemically modified plastics differs from prior techniques in several respects. The adsorptive properties of the polymeric carrier molecule localize the attached aryl azide to the plastic surface to be modified. This avoids the requirement to dry the aryl azide compound onto the surface prior to the photolysis that generates a reactive nitrene from an azide functional group. Thus, rather than immobilizing a protein or other polymeric carrier to a polymer surface after first photo-crosslinking an aryl azide to the polymer surface, the present technique can be used to join the polymeric carrier molecule (e.g., a protein) to the polymer surface using the photochemical attachment. The exemplary NHS and maleimide attachment chemistries can be used to covalently join the aryl azide functional group to the structure of the polymeric carrier molecule prior to photo-crosslinking. Advantageously, when the polymeric carrier is covalently modified to include both aryl azide and a secondary functional group (e.g., a biotin moiety), this provides a highly efficient route for immobilizing the secondary functional group onto the plastic surface via immobilization of the polymeric carrier molecule. Photo-crosslinking can occur either in a liquid phase (e.g., an aqueous solution substantially free of carbon-containing compounds), or optionally in a dry condition. Optionally, photo-crosslinking can take place in a water solution. As well, the present technique does not require removing or deactivating excess reactive groups that failed to participate in the covalent immobilization following UV irradiation (i.e., the crosslinking step).

In yet another distinction from prior methods employing conventional chemical crosslinking approaches, excess reagent to be crosslinked (i.e., the polymeric carrier covalently joined to the photochemical crosslinker) can be removed from contact with the surface to be modified before the covalent crosslinking takes place in particular embodiments set forth herein. The ability to promote covalent attachment after removing non-adsorbed material from contact with the plastic surface (e.g., by washing) reduces undesired interactions between photoactivated nitrenes and secondary chemical moieties (e.g., biotin moieties) also displayed on the plastic-adsorbent polymeric carrier. Where other techniques enhance contact between a solid support and a photoactive reagent by drying a sample of the reagent onto the surface to be modified (i.e., so that all of the reagent in the starting liquid volume contacts the surface), various embodiments of the present technique achieve excellent results by a different approach. More specifically, contact between the photoactivatable reagent and the surface to be modified is mediated by adsorptive properties of the polymeric carrier. By this approach, the non-adsorbed polymeric carrier can be, and preferably is, removed from contact with the plastic surface to be modified before initiating the UV exposure that promotes covalent bond formation. Since photoactivatable crosslinkers in accordance with the present technique are reactive with carbon-hydrogen (i.e., C—H) bonds and carbon-carbon (e.g., C—C and/or C═C) bonds, it is desirable for any liquid phase that may be present during the photochemical crosslinking procedure to be substantially free of carbon-containing buffers or other agents. In this regard, photochemical crosslinking can be performed in a solution consisting essentially of water, or aqueous phosphate or borate buffers (as examples) free of non-adsorbed plastic-adsorbent polymeric carrier joined to the photoactivatable moiety (e.g., the aryl azide).

Useful Secondary Agents for Polymeric Carrier Attachment

A wide range of different secondary agents, in addition to the photochemical crosslinker moiety, can be covalently attached to polymeric carrier molecules used in the chemical modification technique. Examples of preferred secondary agents include, without limitation: biotin moieties, trans-cyclooctene-containing "click chemistry" reagents for attaching molecules to a substrate, amine functional groups, epoxide functional groups, aldehyde functional groups, nucleic acids for hybridizing to complementary nucleic acids, receptors (e.g. antibodies, lectins, streptavidin, avidin, or functional fragments having specificity for ligands bound by the full length receptor) for binding to ligands (e.g. epitopes, biotin, carbohydrates or analogs having specificity for the receptor that binds the native ligand), and the like. Methods of covalently introducing these functional groups into the structure of the polymeric carrier protein or carrier polymer will be familiar to those of ordinary skill in the art.

Once the plastic-adsorbent polymeric carrier modified to include an aryl azide functional group has been photochemically crosslinked to the plastic surface (e.g., through a secondary amine linkage to a carbon atom of the plastic), secondary agents or chemical moieties displayed on the covalently attached polymeric carrier can serve as attachment sites (i.e., reactive groups useful for subsequent chemical attachment) for other molecules that may be of interest.

Alternative Methods of Covalently Modifying Proteins

The use of proteins as polymeric carriers for the aryl azide, and optionally secondary chemical functional groups, advantageously afford a wide range of chemical attachment approaches. Preferably, the derivatized polymeric carrier is first covalently bonded to the plastic in a photochemical reaction. Optionally, the modified plastic surface subsequently is used for binding a biological macromolecule (e.g., a protein, a nucleic acid, a carbohydrate, a lipid, etc.). Carrier proteins frequently contain a variety of chemical functional groups that can serve as chemical attachment sites. Of course, the polymeric carrier will be modified to contain at least the aryl azide functional group, and optionally will contain, or be further modified to contain secondary functional groups.

Indeed, conventional techniques for chemical modification of proteins can be used to introduce aryl azide and secondary functional groups according to the method described herein. For example, lysine residues of proteins harbor side chains having an ε-amino group that may be positively charged under appropriate pH conditions (e.g., physiological pH). The nitrogen of the ε-amino group readily reacts with an NHS-esterified chemical moiety to covalently join the chemical moiety to the protein. Isocyanates and isothiocyanates undergo a similar addition mechanism. Cysteine residues of proteins harbor thiol side chains that can be reacted with maleimides and iodoacetamides to covalently attach conjugated chemical moieties to the protein. Tyrosine side chains can be reacted and modified through aromatic substitution reactions selective for the aromatic carbon adjacent to the phenolic hydroxyl group. Here, diazonium salts having conjugated chemical moieties can be used for covalently attaching the chemical moieties to the protein. There also can be modifications of the protein amino terminus, for example using reactions exemplified above for the ε-amino group of lysine. The method of chemical modification can be selected in coordination with the polypeptide sequence of the protein being used as the polymeric carrier to best employ available side chain functional groups.

Photoactivation Apparatus

There is flexibility in the selection of the photoactivation apparatus to be used for covalent attachment of the derivatized polymeric carrier to the plastic surface via the aryl azide functional group. Commercially available "UV crosslinker" devices commonly used for crosslinking nucleic acids (e.g., DNA and RNA) to nylon, nitrocellulose, or nylon-reinforced nitrocellulose membranes, can be used to promote covalent attachment of an aryl azide-carrier to the plastic surface undergoing covalent modification. Manufacturers and/or suppliers of such devices include UVP, LLC (Upland, Calif.), Thermo Fisher Scientific Inc. (San Diego, Calif.), Spectronics Corp. (Westbury, N.Y.), and Stratagene (La Jolla, Calif.). A Stratalinker® UV crosslinker 2400 (Stratagene) providing an output of about 4,000 μwatts/cm$^2$ has been used with good results. Determining optimal time and UV output conditions needed for any particular instrument to perform the photochemical attachment described herein is simply a matter of routine experimentation for those having an ordinary level of skill in the art.

Sample Workflows

As described above, undesired loss of sequencing templates from flow cell surfaces has been observed to result from unstable attachment to plastic substrates. This problem has been overcome, as demonstrated herein, by covalent attachment of a plastic-adsorbent polymeric carrier molecule to the plastic surface. Chemical functional groups displayed on the covalently attached polymeric carrier could then be employed for attachment of molecular species in downstream procedures. Efficient attachment of the plastic-adsorbent polymeric carrier can be achieved by first obtaining or preparing a polymeric carrier covalently attached to an aryl azide (e.g., a perfluorinated aryl azide), adsorbing the modified polymeric carrier to the plastic, and then photo-crosslinking the modified polymeric carrier to the plastic. By this approach, the modified plastic surface can be prepared in a manufacturing environment and separated in time from subsequent steps to be performed by an end user of the modified plastic article. This can provide the advantage of producing flow cells and other analytical components under the benefit of quality control procedures common to a manufacturing environment while providing for use of the analytical components in a separate research or clinical environment. Of course, in some situations the analytical components can be manufactured and used in the same location.

The procedure disclosed herein generally involves adsorbing to a plastic surface a polymeric carrier that includes a covalently attached aryl azide (e.g., a perfluorinated aryl azide), and that optionally includes a secondary moiety. By this approach, the aryl azide can be delivered to the plastic surface in a highly efficient manner to facilitate subsequent photoactivation of the azide functional group for covalent attachment to the plastic. For example, when the plastic-adsorbent polymeric carrier is a protein (e.g., BSA), the carrier protein can be covalently modified to include an aryl azide (e.g., a perfluorinated aryl azide, such as a tetrafluoroaryl azide), and optionally a secondary moiety (e.g., a biotin moiety). A modified plastic surface covalently bound to a biotinylated carrier protein can then be used for attachment of streptavidin, which can be followed by attachment of a second biotinylated molecular species. Optionally, the second biotinylated molecular species is an oligonucleotide primer. Optionally, the oligonucleotide primer serves as a forward rolling circle amplification (RCA) primer (e.g., which can be prehybridized to single-stranded circular DNA templates). In an illustrative example, these components were used to produce RCA clusters on plastic surfaces for sequencing. A primer need not be used for RCA, instead being used for solid-phase polymerase chain reaction (PCR), bridge amplification, recombinase polymerase amplification, multiple displacement amplification or combinations thereof. The procedure advantageously permits crosslinking of the aryl azide-modified polymeric carrier to the plastic surface while in contact with a liquid phase. Following photochemical crosslinking, the crosslinked surface can be dried and stored desiccated in an air-tight container for subsequent use.

Generalized Steps for Particular Embodiments

The process for preparing a plastic article in accordance with a technique disclosed herein can begin with a step for obtaining a plastic-adsorbent polymeric carrier functionalized with a photochemical crosslinker moiety (e.g., an aryl azide, such as a perfluoro-aryl azide having C—F bonds instead of C—H bonds). This may involve either preparing or acquiring a plastic-adsorbent polymeric carrier prepared as described herein. Optionally, the plastic-adsorbent polymeric carrier is chemically reacted with one or more NHS-activated species, including, for example, fluorinated, aryl azide-based, amine- and photoreactive crosslinkers used for the photofunctionalization of polymer surfaces. This includes, for example, N-succinimidyl 4-azido-2,3,5,6-tetrafluorobenzoate. In some embodiments, the plastic-adsorbent polymeric carrier functionalized with the aryl azide is further modified to display secondary functional groups, such as: biotin moieties, trans-cyclooctene-containing "click chemistry" reagents for attaching molecules to a substrate, amine functional groups, epoxide functional groups, aldehyde functional groups, etc.

Next, there can be a step for functionalizing a surface of the plastic article by contacting it with the photochemical crosslinker-functionalized plastic-adsorbent polymeric carrier, and then photo-crosslinking the plastic surface and the plastic-adsorbent polymeric carrier. Optionally, the photochemical crosslinker is an aryl azide, and the aryl azide is a perfluorinated aromatic azide, such as 4-azido-2,3,5,6-tetrafluorobenzoate. Optionally, the plastic-adsorbent polymeric carrier is a protein, such as BSA protein. In preferred embodiments, aryl azide-functionalized plastic-adsorbent polymeric carrier remaining free in solution (i.e., not adsorbed to the plastic surface) is removed prior to the photochemical crosslinking step. For example, a solution of the aryl azide-functionalized plastic-adsorbent polymeric carrier can be replaced with a water solution prior to UV irradiation. Optionally, the adsorbed plastic surface washed with water is dried (e.g., residual water being evaporated) prior to UV irradiation. Optionally, the adsorbed plastic surface washed with water is exposed to UV irradiation while remaining in a wet condition (i.e., without needing to be completely dry).

Optionally there is a step for removing liquid from the crosslinked plastic article. A further option allows storing the crosslinked plastic article (e.g., in dry form) for later use. Optionally, the plastic article is stored under an inert gas atmosphere. For example, the plastic article can be stored under a nitrogen or argon atmosphere.

Regardless of whether the crosslinked plastic article is used immediately following its manufacture or after a period of storage, there can additionally be optional steps for attachment of proteins, peptides, oligonucleotides, or single- or double-stranded nucleic acids to the modified plastic surface. If the modified plastic surface displays biotin moieties, then the surface can be contacted with a streptavidin protein to provide a surface available for immobilizing biotinylated molecular species (e.g., biotinylated capture oligonucleotides or primers). If the modified plastic surface displays primary amino functional groups (e.g., lysine side chains), then the surface can be contacted with molecular species that include an N-hydroxysuccinimide (NHS) chemical activating group. For example, this includes a homobifunctional NHS-NHS reagent that reacts with primary amines, and results in a surface capable of covalently immobilizing chemical species containing or modified to contain a primary amine (e.g., an oligonucleotide modified to include a primary amine at its 5'-terminus).

Manufacture of Amino Plastic

In one embodiment, the disclosed technique involves the manufacture and use of an "amino plastic" that displays primary amine functional groups. Bovine serum albumin protein naturally contains 59 lysine residues. Of these, approximately 35-39 lysine side chains are solvent-exposed for the native conformation of the protein, and thus readily reactive with N-succinimidyl (NHS) reagents which can be used for covalent attachment. In the first step of this procedure, BSA is chemically modified to include a photoactivatable aryl azide, such as the UV crosslinking reagent, N-succinimidyl 4-azido-2,3,5,6-tetrafluorobenzoate. When using BSA at a concentration of about 135 µM, treatment with 100 mM of this reagent yields approximately 16-18 (possibly as many as 20) modifications per subunit of BSA. This leaves approximately 15-20 primary amines of the lysine residues available for subsequent modification. In the next step of the procedure, the modified BSA is optionally flowed into a plastic flow cell, or otherwise contacted with a plastic surface that is to be modified. This can be followed by a wash step using high salt and detergent to remove any protein not physically adsorbed to the plastic to produce a monolayer. The wash can then be chased by flowing pure water to remove any detergent, buffer, or other carbon-containing species from contact with the plastic prior to UV crosslinking. Since the 4-azido-2,3,5,6-tetrafluorobenzoate moiety efficiently inserts directly into carbon-hydrogen and/or carbon-carbon bonds that are sufficiently close to the modified BSA following UV irradiation, the presence of carbon-containing molecular species in solution would represent unproductive insertion targets. The flow cell is then exposed to UV light to crosslink the subunits of the monolayer to the plastic, and to each other. This generates a very stable "amino plastic" flow cell, where free primary amines are provided by lysine side chains. These primary amines are highly reactive with NHS esterified chemical agents, and so provide a route for immobilizing those agents.

Any NHS reagent can be used for functionalization of the amino plastic surface. Optionally, the amino plastic surface is reacted with a homobifunctional NHS-NHS reagent. The resulting surface is reactive with, and so can covalently immobilize chemical species containing or modified to include primary amines (e.g., 5'-aminated oligonucleotides). Optionally, the amino plastic surface is reacted with NHS-tetrazine to result in a surface that is reactive with trans-cyclooctene (TCO)-modified species (e.g., TCO-modified oligonucleotides).

Manufacture of Biotinylated Plastic

In another embodiment, "biotinylated plastic" can be manufactured and used in accordance with the disclosed technique. As described immediately above, a plastic-adsorbent polymeric carrier covalently joined to an aryl azide functional group is used in the procedure. However, the plastic-adsorbent polymeric carrier is further covalently joined to a biotin moiety. Optionally, a plastic-adsorbent polymeric carrier is chemically modified in a single step by covalent modification with independent aryl azide and biotin moieties. Alternatively, a plastic-adsorbent polymeric carrier is first covalently modified with one of these agents (e.g., the polymeric carrier displaying biotin functional groups), and thereafter modified by covalent attachment to the second agent (e.g., the aryl azide functional group). As above, processing the plastic surface using the biotinylated aryl azide-carrier in place of the aryl azide-carrier that does not include biotin moieties yields a modified plastic surface displaying biotin functional groups. Here the biotinylated plastic surface can be contacted with a streptavidin protein to immobilize the streptavidin, which subsequently can be contacted with a biotinylated molecular species (e.g., a biotinylated protein or oligonucleotide) for capture onto the streptavidin-coated surface.

Flow Cell Embodiments: Nucleic Acid Sequencing

Preferred uses of the modified plastics include construction of flow cells that can be used for biochemical analyses, including nucleic acid sequencing analyses. Here a first substantially planar section of plastic modified in accordance with the described procedure is maintained in a spaced-apart arrangement from a second substantially planar member by an adhesive gasket material. The second substantially planar member optionally contains one or more channels, where inlet and outlet ports are disposed at opposite ends of each channel. The gasket material contacts the modified plastic on a face bearing the chemical modification, and the space between the first and second planar members defines the interior volume of the flow cell. In some embodiments, the second substantially planar member of the flow cell is a second section of the same modified plastic, an unmodified plastic, or glass. Fluidic ports provide entry and exit points for liquid reagents transiting through the flow cell. Nucleic acids or oligonucleotides can be immobilized to the modified plastic surface of the flow cell by a variety of means. For example, if the modified plastic surface includes immobilized streptavidin, then biotinylated nucleic acids or oligonucleotides contacting the streptavidin will become immobilized thereto, and can serve as templates, primers, capture probes, etc.

Optionally, the immobilized oligonucleotides can serve as primers in nucleic acid amplification reactions. Optionally, the nucleic acid amplification reactions are rolling circle amplification (RCA) reactions. Optionally, primers contacting the modified plastic are already hybridized to circularized DNA template molecules at the time the primers contact the modified plastic and become immobilized. Alternatively, circularized DNA templates hybridize to the primers after the primers are already immobilized to the modified plastic surface. In another configuration, two ends of a linear template hybridize to the primer such that the ends can be ligated to form a circular template. Amplification products synthesized in place (e.g., at a fixed position within a flow cell) are said to be synthesized "in situ."

Optionally, an RCA or other nucleic acid amplification reaction is first conducted in solution contained within a reaction vessel (i.e., being synthesized "in vitro"), and amplification products are captured onto the modified plastic surface of the flow cell. This conveniently may involve use of a 5'-biotinylated primer to create primer extension products.

An alternative method that can be used for amplifying nucleic acids (sometimes called "bridge amplification") is described in U.S. Pat. App. Pub. No. 2008/0160580, the disclosure of which is incorporated by reference herein. This method for parallel amplification of a collection of single nucleic acid molecules of different sequence can include a step for treating the collection of nucleic acid molecules to be amplified such that each nucleic acid molecule to be amplified contains a known, common sequence at the 5' and 3' ends. Next, there can be a step for separating the collection of different nucleic molecules to be amplified such that individual molecules with different sequences are separated from each other. Next, there can be a step for performing a single amplification reaction using amplification primers complementary to the known common sequences that simultaneously amplifies the whole collection of single nucleic acid molecules. In some embodiments, at least one amplification primer is immobilized on a solid support (e.g., a planar surface or a microbead). The solid support can be attached to primers that complement known sequences at one or both ends of the template sequences that are to be sequenced.

Sequencing primers hybridized to nucleic acid amplification products immobilized to a modified plastic surface can be used for determining the sequence of the amplification product, which serves as the sequencing template. The type of sequencing reaction to be conducted is a matter of choice. Common approaches include sequencing-by-synthesis (where cognate nucleotide identification requires an incorporation reaction), and sequencing-by-binding (where cognate nucleotide identification takes place without incorporation). Each of these different approaches requires iterative cycles of flowing reagents through the flow cell.

Particularly useful sequencing reactions are sequencing-by-binding reactions as described in commonly owned U.S. patent application Ser. No. 14/805,381 (published as US 2017/0022553 A1); 62/447,319 (or its priority-related application which published as US 2018/0044727 A1); 62/440,624 (or priority-related application U.S. patent application Ser. No. 15/851,383 claims priority); or 62/450,397 (or priority-related application U.S. patent application Ser. No. 15/873,343), each of which is incorporated herein by reference. Generally, methods for determining the sequence of a template nucleic acid molecule can be based on formation of a ternary complex (between polymerase, primed nucleic acid and cognate nucleotide) under specified conditions. The method can include an examination phase followed by a nucleotide incorporation phase.

The examination phase can be carried out in a flow cell having at least one template nucleic acid molecule primed with a primer; contacting the primed template nucleic acid molecule(s) with a first reaction mixture that includes a polymerase and at least one nucleotide type; observing the interaction of polymerase and a nucleotide with the primed template nucleic acid molecule(s), under conditions where the nucleotide is not covalently added to the primer(s); and identifying a next base in each template nucleic acid using the observed interaction of the polymerase and nucleotide with the primed template nucleic acid molecule(s). The interaction between the primed template, polymerase and nucleotide can be detected in a variety of schemes. For example, the nucleotides can contain a detectable label. Each nucleotide can have a distinguishable label with respect to other nucleotides. Alternatively, some or all of the different nucleotide types can have the same label and the nucleotide types can be distinguished based on separate deliveries of different nucleotide types to the flow cell. In some embodiments, the polymerase can be labeled. Polymerases that are associated with different nucleotide types can have unique labels that distinguish the type of nucleotide to which they are associated. Alternatively, polymerases can have similar labels and the different nucleotide types can be distinguished based on separate deliveries of different nucleotide types to the flow cell.

During the examination phase, discrimination between correct and incorrect nucleotides can be facilitated by ternary complex stabilization. A variety of conditions and reagents can be useful. For example, the primer can contain a reversible blocking moiety that prevents covalent attachment of nucleotide, and/or cofactors that are required for extension, such as divalent metal ions can be absent, and/or inhibitory divalent cations that inhibit polymerase-based primer extension can be present, and/or the polymerase that is present in the examination phase can have a chemical modification and/or mutation that inhibits primer extension, and/or the nucleotides can have chemical modifications that inhibit incorporation, such as 5' modifications that remove or alter the native triphosphate moiety.

The extension phase can then be carried out by creating conditions in the flow cell where a nucleotide can be added to the primer on each template nucleic acid molecule. In some embodiments, this involves removal of reagents used in the examination phase and replacing them with reagents that facilitate extension. For example, examination reagents can be replaced with a polymerase and nucleotide(s) that are capable of extension. Alternatively, one or more reagents can be added to the examination phase reaction to create extension conditions. For example, catalytic divalent cations can be added to an examination mixture that was deficient in the cations, and/or polymerase inhibitors can be removed or disabled, and/or extension competent nucleotides can be added, and/or a deblocking reagent can be added to render primer(s) extension competent, and/or extension competent polymerase can be added.

The above examination and extension phases can be carried out cyclically such that in each cycle a single next correct nucleotide is examined (i.e. the next correct nucleotide being a nucleotide that correctly binds to the nucleotide in a template nucleic acid that is located immediately 5' of the base in the template that is hybridized to the 3'-end of the hybridized primer) and, subsequently, a single next correct nucleotide is added to the primer. Any number of cycles can be carried out including, for example, at least 1, 2, 5, 10, 20, 25, 30, 40, 50, 75, 100, 150 or more cycles. Alternatively or additionally, the number of cycles can be capped at no more than 150, 100, 75, 50, 40, 30, 25, 20, 10, 5, 2 or 1 cycles.

Sequencing-by-synthesis (SBS) techniques can also be carried out on modified plastic surfaces described herein. SBS generally involves the enzymatic extension of a nascent primer through the iterative addition of nucleotides against a template strand to which the primer is hybridized. Briefly, SBS can be initiated by contacting target nucleic acids, attached to features in a flow cell, with one or more labeled nucleotides, DNA polymerase, etc. Those features where a primer is extended using the target nucleic acid as template will incorporate a labeled nucleotide that can be detected. Optionally, the labeled nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for embodiments that use reversible termination, a deblocking reagent can be delivered to the flow cell (before or after detection occurs). Washes can be carried out between the various delivery steps. The cycle can then be repeated n times to extend the primer by n nucleotides, thereby detecting a sequence of length n. Exemplary SBS procedures, reagents and detection instruments that can be readily adapted for use with an array produced by the methods of the present disclosure are described, for example, in Bentley et al., Nature 456:53-59 (2008), WO 04/018497; WO 91/06678; WO 07/123744; U.S. Pat. Nos. 7,057,026; 7,329,492; 7,211,414; 7,315,019 or 7,405,281, and U.S. Pat. App. Pub. No. 2008/0108082 A1, each of which is incorporated by reference herein. Also useful are SBS methods that are commercially available from Illumina, Inc., San Diego Calif.

Regardless of the sequencing platform employed, nucleic acid detection can be effected by detecting a sequence of multiple nucleotides, or even by detecting a single nucleotide. For example, International App. No. PCT/US2017/026376 (the disclosure of which is incorporated by reference herein) illustrates detection of a nucleic acid target by determining the sequence of a single nucleotide. The surface treatments and methods for their manufacture can be used in a genotyping method whereby target sequences that are attached to a surface as set forth herein can be detected using methods set forth in U.S. Pat. No. 9,932,631, which is incorporated by reference herein.

Kits

Kits in accordance with the invention may include reagents for chemically treating a plastic material to covalently bond the plastic to a polymeric carrier, where the polymeric carrier optionally includes a secondary chemical moiety. The secondary chemical moiety can be any of: biotin moieties, "click chemistry" reagents for attaching molecules to a substrate, amine functional groups, epoxide functional groups, aldehyde functional groups, etc.

Kits may additionally or alternatively include a single flow cell comprising a chemically modified plastic article, for example to replace a consumable part used in a biochemical procedure (e.g., SNP or nucleic acid sequence determination). Alternative kits include packaged combinations of a flow cell incorporating a plastic material modified in accordance with the disclosure, and one or more reagents for nucleic acid sequence analysis (e.g., one or more nucleotides or nucleotide analogs, buffered wash reagents, one of more chemical reagents for cleaving a reversible terminator moiety from a reversible terminator nucleotide, a polymerase, etc.).

Still other useful kits include: one or more flow cells including a plastic surface modified with protein covalently bonded thereto in accordance with the disclosed method, where the protein includes biotin functional groups; a streptavidin reagent (either desiccated or in solution); and one or more types of biotinylated oligonucleotide (e.g., a 5'-biotinylated oligonucleotides).

EXAMPLES

Example 1 describes procedures that demonstrated photo-crosslinking of a plastic surface to a chemically modified polymeric carrier protein. The carrier protein had been chemically modified prior to photo-crosslinking with a photoactivatable crosslinking reagent, and further had been modified to include a secondary chemical moiety. In this illustration, the secondary chemical moiety was a biotin moiety. The crosslinked plastic subsequently was used to capture streptavidin, and the streptavidin-coated surface was then used to capture a biotinylated oligonucleotide that served as a nucleic acid amplification primer. A control surface was not exposed to UV light, and so was not crosslinked.

Example 1

Chemical Modification of Plastic Surface

Bovine serum albumin was chemically modified to include both of a photochemical crosslinker moiety and a biotin moiety, and then attached to a plastic surface following UV irradiation to promote photochemical crosslinking. A 1 mg/ml stock solution of biotinylated BSA in 1×PBS (or about 15 µM protein concentration) first was obtained. A 5 µl volume of 100 mM N-succinimidyl 4-azido-2,3,5,6-tetrafluorobenzoate (Santa Cruz Biotechnology; Dallas; TX) in 100% DMSO was added to 1 ml of the biotinylated BSA stock, immediately mixed, and then allowed to incubate at room temperature for 45 minutes. This was predicted to covalently incorporate 12-15 4-azido-2,3,5,6-tetrafluorobenzoate modifications for each protein molecule. Following covalent modification of the biotinylated BSA, the reaction mixture was aliquoted into low protein-binding amber tubes and stored at −80° C.

Next, the surface of a polystyrene plastic slide was coated with the chemically modified BSA. Here 7.5 µl of the BSA conjugate was contacted to a plastic slide with a cover-slip and gasket. This volume slightly exceeded to volume of contained within the flow cell between its planar upper and lower surfaces. The flow cell was then washed using a buffer solution that included 400 mM NaCl and 0.05% Tween-20 nonionic detergent to generate a monolayer. This solution was then replaced by flowing water through the flow cell. This resulted in a plastic surface adsorbed by the aryl azide-modified biotinylated protein. There was substantially no residual free NHS-aryl azide left in the flow cell after the water flow.

Next, proteins bound to the plastic material by adsorption were photo-crosslinked to the plastic surface and to each other as a monolayer. Flow cells containing water as the liquid were subjected to UV irradiation at 100 mJ/cm2 using a commercially obtained UV crosslinker that delivered 254 nm UV light from a collection of 15 watt bulbs. Crosslinking was stopped after about 5 minutes. In a procedure illustrating a manufacturing alternative, following UV crosslinking, water was removed from the flow cell, and the flow cell dried under a nitrogen stream and then stored for three days under an argon atmosphere before use.

Flow cells containing the crosslinked plastic surfaces were flushed with a Tris-buffered solution (pH 8) that included 400 mM NaCl and 0.05% Tween-20 (i.e., "1×Hyb V1" solution), as above. An aliquot of this same solution supplemented with streptavidin was then added to the flow cell to allow binding of the streptavidin to the plastic surface that has been crosslinked to the biotinylated carrier BSA protein. Non-bound streptavidin was removed by flushing the flow cell with 1×Hyb V1. This resulted in a surface having streptavidin immobilized thereon. In some instances, the plastics chemically modified by covalent attachment of the biotinylated protein were stored dry in a sealed container under an argon atmosphere before contacting the solution that included streptavidin.

Streptavidin surfaces were then contacted with 20 µl of single-stranded circularized DNA templates that had been prehybridized to a forward RCA primer having a biotin moiety at its 5'-end. In this trial, the RCA primer harbored dual biotin moieties. Following a 10-minute incubation at room temperature, non-bound primer and ring solution was flushed from the flow cell using a flow of 1×Hyb V1. Next, RCA equilibration buffer was flowed through the flow cell to replace the 1×Hyb V1. Thereafter, a volume of RCA reaction mixture (i.e., a standard reaction mixture for conducting rolling circle amplification of nucleic acids, as will be familiar to those having an ordinary level of skill in the art) was flowed into the flow cell and allowed to incubate for 25 minutes at 30° C., during which time primers were extended using the hybridized rings as templates. The RCA reaction was quenched using 200 µl of a PBS-based blocking solution that was supplemented with 4 mM EDTA. The quenching solution was replaced with a flow of 1×Hyb V1 solution, and then two sequencing primers harboring distinguishable fluorescent labels were then hybridized to amplification products in 1×Hyb V1 solution at 65° C. Non-hybridized sequencing primers were flushed from the flow cell, and the detectable labels imaged to locate positions of amplification products within the flow cells. Fluorescent moieties were bleached, and cycles of cognate base determination performed using fluorescently labeled polymerases.

Control procedures that provided a basis for comparison involved physical adsorption of the BSA conjugate without subsequent UV crosslinking. All other steps in the above-described procedure were followed, omitting the drying step. The flow cell was washed with an RCA equilibration buffer, and then hybridized to circularized DNA templates. Nucleic acid amplification was conducted using an RCA protocol, and the amplification products used as sequencing templates.

Images of fluorescence localized to nucleic acid features within the different flow cells were processed similarly. Intensity of fluorescence, and the area (measured in pixels) of each nucleic acid feature were measured for determination of the first and fourteenth cognate bases of the amplified templates. Comparing the number of counted features at the start and finish of the sequencing procedure provided information about retention or loss of nucleic acids from the different plastic surfaces. The fact that the primer was covalently attached to the streptavidin protein of the control surface meant that observed losses could not be attributed to compromised noncovalent interaction between the streptavidin protein and a biotinylated oligonucleotide. Results from the procedure are shown in Table 1 (numbers in the table indicate counts of features visualized within a single field of view).

TABLE 1

| Nucleic Acid Feature Retention | | | |
| --- | --- | --- | --- |
| Attachment | Nucleotide # 1 | Nucleotide # 14 | Retention |
| Adsorption Only | 1405 | 1106 | 79% |
| Crosslinked Biotinylated Plastic (not dried) | 33425 | 33425 | 100% |
| Crosslinked Biotinylated Plastic (dried) | 41116 | 41116 | 100% |

The results shown in Table 1 confirmed that chemical modification of the plastic substrate used for nucleic acid amplification in situ followed by sequencing yielded outstanding retention of nucleic acid features. After determination of 14 bases using the iterative sequencing-by-binding protocol, about 20% of nucleic acid features were lost from the plastic surface bound to streptavidin by nonspecific adsorption of the carrier protein only. Conversely, 100% of the nucleic acid features were retained on plastic surfaces that had been photochemically crosslinked to a carrier protein covalently modified to include aryl azide and biotin moieties, and then contacted with streptavidin and a biotinylated oligonucleotide primer.

Notably, while the above illustration was performed using polystyrene as the plastic to be modified, similarly good results were obtained using several other types of plastic materials. Thus, success of the technique is not believed to depend on identity of the plastic.

It is to be understood that the headings used herein are for organization only, and are not meant to limit the description or claims.

A number of embodiments have been described. Nevertheless, it will be understood that various modifications may be made. Accordingly, other embodiments are within the scope of the claims.

What is claimed is:

1. A flow cell, comprising:
   (a) a first substantially planar member comprising a plastic surface, the plastic surface being covalently attached to a plastic-adsorbent polymeric carrier by a linker, wherein the linker comprises a secondary amine covalently joined to a tetrafluoroaryl functional group, wherein the plastic-adsorbent polymeric carrier is a monolayer, and wherein the plastic-adsorbent polymeric carrier comprises a chemical moiety that is covalently attached to nucleic acids; and
   (b) a second substantially planar member, wherein a space between the first and second substantially planar members is an interior space, said interior space being in fluid communication with an exterior space through each of an inlet port and an outlet port.

2. The flow cell of claim 1, wherein the tetrafluoroaryl functional group comprises an azide.

3. The flow cell of claim 1, wherein the linker comprises an aryl azide.

4. The flow cell of claim 1, wherein the chemical moiety is a biotin.

5. The flow cell of claim 1, wherein the chemical moiety is a click chemistry reagent.

6. The flow cell of claim 1, wherein the nucleic acids are trans-cyclooctene (TCO)-modified oligonucleotides.

7. The flow cell of claim 1, wherein the polymeric carrier comprises a biological macromolecule.

8. The flow cell of claim 7, wherein the polymeric carrier comprises a protein.

9. The flow cell of claim 7, wherein the polymeric carrier comprises streptavidin.

10. The flow cell of claim 1, wherein the nucleic acids are nucleic acid amplification products, and wherein the nucleic acid amplification products are hybridized to nucleic acid primers.

11. A method of detecting an analyte disposed within a flow cell, comprising the steps of:
   (a) providing the flow cell of claim 1;
   (b) attaching the analyte to the plastic-adsorbent polymeric carrier; and
   (c) detecting the analyte attached to the polymeric carrier.

12. The method of claim 11, wherein step (c) comprises detecting interaction between the analyte attached to the plastic-adsorbent polymeric carrier and a ligand therefor.

13. The method of claim 11, wherein the analyte attached to the plastic-adsorbent polymeric carrier comprises a nucleic acid, and wherein the method further comprises amplifying the attached nucleic acid using a nucleic acid amplification reaction.

14. The method of claim 13, wherein the nucleic acid amplification reaction is an isothermal nucleic acid amplification reaction.

15. The method of claim 11,
   wherein the analyte and the plastic-adsorbent polymeric carrier each comprise biotin moieties,
   wherein the biotin moiety of the plastic-adsorbent polymeric carrier is bound to a streptavidin protein, and
   wherein the streptavidin protein is bound to the biotin moiety of the analyte.

16. The method of claim 15,
   wherein the analyte comprises a primed template nucleic acid molecule, and
   wherein step (c) comprises detecting the analyte by determining the identity of at least one nucleotide in a nucleic acid sequencing procedure.

17. The method of claim 15,
   wherein the analyte comprises a primed template nucleic acid molecule, and
   wherein step (c) comprises detecting a nucleic acid sequence that is present in the primed template nucleic acid molecule.

18. The method of claim 17, wherein step (c) further comprises performing an iterative set of reactions to determine identities of a plurality of individual nucleotides in the primed template nucleic acid molecule.

19. The method of claim 18, wherein more than 80% of the analyte attached in step (b) remains attached to the plastic-adsorbent polymeric carrier after determining the identities of 14 nucleotides of the primed template nucleic acid molecule.

20. A kit comprising:
   (a) the flow cell of claim 1; and
   (b) one or more reagents for nucleic acid sequence analysis comprising at least one of a nucleotide, a nucleotide analog, and a polymerase.

* * * * *